United States Patent [19]

Vargo

[11] Patent Number: 5,081,362
[45] Date of Patent: Jan. 14, 1992

[54] DIRECTIONAL RADIATION PROBE

[76] Inventor: George J. Vargo, 95 W. River Road North, Fulton, N.Y. 13069

[21] Appl. No.: 358,948

[22] Filed: May 30, 1989

[51] Int. Cl.⁵ .............................. G01T 1/11; G01J 5/06
[52] U.S. Cl. ................... 250/472.1; 250/495.2; 250/483.1; 250/485.1; 250/486.1
[58] Field of Search ............... 250/472.1, 474.1, 475.2, 250/482.1, 483.1, 485.1, 486.1, 253, 366, 377, 370.01, 394

[56] References Cited

U.S. PATENT DOCUMENTS 4,172,226 10/1979 Rubin ................... 250/394
4,757,201 7/1988 Kanter ................... 250/337
4,800,272 1/1989 Harley et al. ................ 250/253

Primary Examiner—Constantine Hannaher
Assistant Examiner—Edward J. Glick

[57] ABSTRACT

A directional radiation probe assembly for making precision radiation surveys in low intensity radiation fields through measurement of the relative intensities of radiation source distributed about a base point. The assembly include a positionable base member supporting a plurality of passive integrating type radiation detectors individually located in recesses disposed in predetermined spatial relation in the outer surface of the base member.

4 Claims, 1 Drawing Sheet

DIRECTIONAL RADIATION PROBE

This invention relates to radiation detection and more particularly to an improved construction for a directional radiation detection device.

BACKGROUND OF THE INVENTION

The deleterious effects of undue radiation exposure to human and other life forms have necessitated the widespread utilization of passive low level radiation detection devices, such as thermo luminescent dosimeters (TLDs) and film type badges worn by individuals whose spheres of daily activity may expose them to ionizing radiation, such as workers in nuclear power plants or other radiation producing or utilizing facilities. Such passive radiation detection devices conventionally function to provide a visual indicia of the quantum of radiation exposure independent of the nature and location of the source thereof. Other types of radiation detectors, such as portable Geiger counters and the like are conventionally employed to locate the sources and intensity of emitted radiation. Neither of the foregoing types of device are of practical utility for making precision radiation surveys in low intensity radiation fields of complex geometry and elucidating the relative contributions of sources within said complex geometries such as those encountered in nuclear power or other radiation producing or utilizing facilities or where a need exists to maintain radiation doses to personnel as low as reasonably achievable.

SUMMARY OF THE INVENTION

This invention may be briefly described as a directional radiation probe assembly for making precision radiation surveys in low intensity radiation fields through measurement of the relative intensity of radiation sources distributed about a base point. In its broader aspects the probe assembly incorporating the invention includes a spherical body portion having a plurality of recesses disposed in predetermined spatial relation on the outer surface thereof and with a discrete radiation detector means disposed in each of said recesses. In a somewhat narrower aspect the invention further includes the utilization of passive integrating type radiation detectors in each of such recesses, such as readily available thermo-luminescent dosimeters or film type badge members.

Among the advantages of the subject invention is the provision of an unmanned and passive probe assembly for disposition in low intensity radiation fields of complex geometry, such as those encountered within and around nuclear facilities. Another advantage of the invention is the provision of a directional radiation probe facilitating the making of precision radiation surveys in low intensity radiation fields to provide accurate reproducible geometry for determining the direction of radiation sources in complex geometries. A still further advantage is the permitted usage of readily available thermo luminescent dosimeters or film badge member as the radiation detectors in the probe assembly.

The object of this invention is the provision of an improved directional radiation detection probe assembly.

Other objects and advantages of the invention will become apparent from the following portions of the specifications and claims and from the appended drawings which illustrate, in accord with the mandate of the patent statutes, a presently preferred embodiment of a directional radiation probe assembly incorporating the principle of this invention.

DETAILED DESCRIPTION OF THE INVENTION

Figure 1:
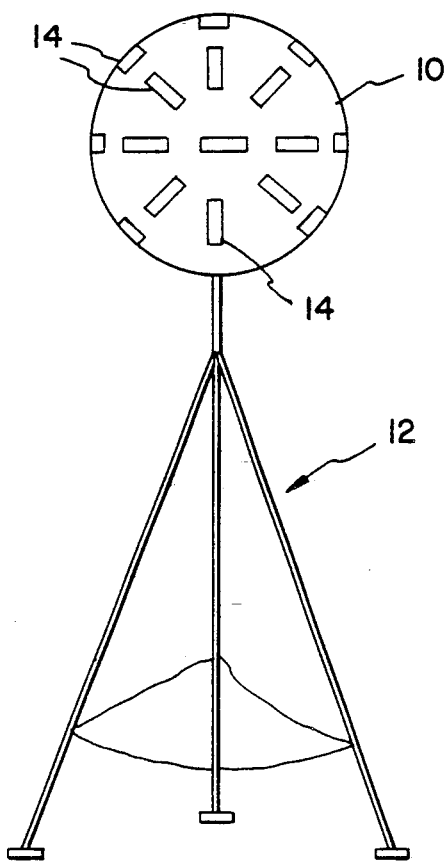
FIG. 1 is an oblique view of the probe assembly as positioned for radiation survey purposes.

Referring to the drawings, there is provided a body member 10 characterized by low radiation transmissivity to minimize, if not to effectively avoid, back radiation exposure. Said body member 10 is preferably of spherical configuration to facilitate omnidirectional radiation intensity measurement and polar coordinate plotting of results obtained therefrom. Suitable body members can be in the form of a six inch diameter sphere of high density metal, suitably constituted of Fe, W, Pb or the like. As best shown in FIG. 1, the body member 10 is adapted to be positioned in space by the use of a tripod mount 12.

The outer surface of the body member 10 includes a plurality of shallow recesses 14 disposed in predetermined spatial relation to the center of the sphere and to each other so as to compositely provide for effectively omnidirectional radiation exposure thereof. Removably disposed within each such recess 14 is a radiation detection means 16, suitably a passive integrating type detection device of conventional character, such as a thermo luminescent dosimeter or a film type radiation detector. The detection means 16 are conveniently positioned in easily removable relation within the recesses by plastic tape, tabs or Velcro type fastening means.

Figure 2:
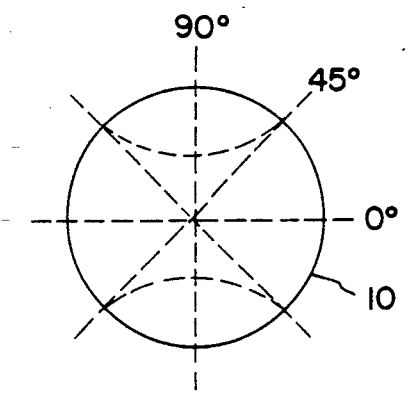
FIG. 2 is a schematic side elevation of the spherical body illustrating a preferred positioning thereon for radiation detector devices.
Figure 3:
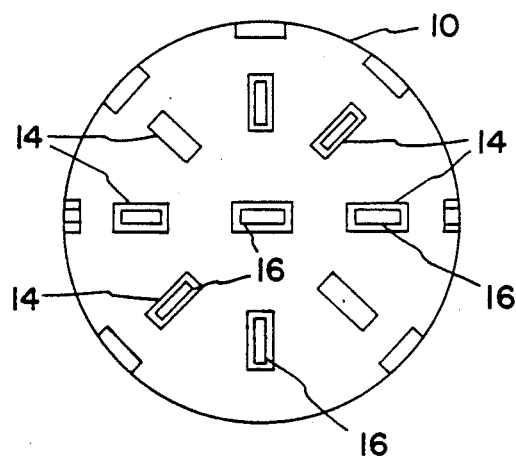
FIG. 3 is a plan view of the directional probe housing assembly.

As best shown in FIGS. 2 and 3, a preferred spatial arrangement for recess location on the sphere surface includes 8 recesses equally spaced around the 0° or horizontal axis, 8 additional recesses equally spaced around the upper and lower 45° axes and a single recess at the upper end of the vertical or 90° axis. The cross sectional area and depth of each recess 14 and the dimensions of the detector means 16 disposed therein will determine the field of exposure and, as such, the selectivity of response.

As will now be apparent, the 25 recesses positioned as described above provides for effective omnidirectional radiation exposure with the radiation detectors 16 being disposed in effectively 45° angular relation to each other. Depending upon the nature of the information to be acquired, a greater or lesser number of recesses 14 can be employed.

Figure 4:
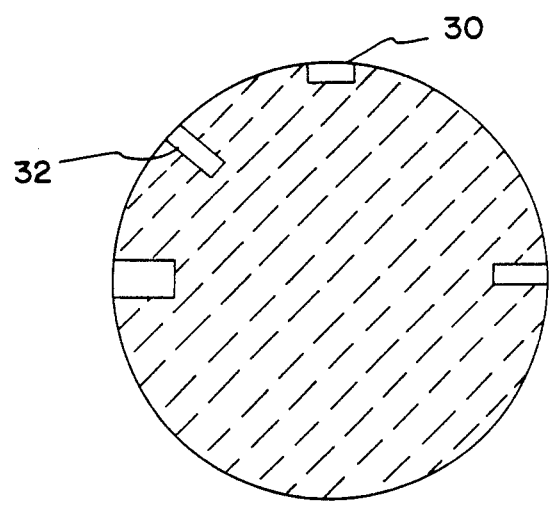
FIG. 4 is a schematic sectional view showing the disposition of a radiation detection device within recesses of differing configuration in the spherical housing.

Additionally, greater selectivity of individual detector means response may be obtained by increasing the depth of a recess 14 for any given cross sectional area thereof. In general the deeper the recess, the greater will be the collimation effect on radiation emanating from a remote source disposed in offset relation to the radial axis of the recess. Such permitted variation in recess depth and cross sectional area is schematically depicted in FIG. 4.

As there shown, recess 30 is of shallow depth and of relatively large cross sectional area and as such subject to radiation emanating from within a relatively large area of exposure. In contradistinction therewith, recess 32 is of relatively small cross sectional area and of appreciable depth and, as such subject to radiation emanating from within a relatively small area of exposure in the surrounding environment.

The directional probe assembly described above is ideally suited for use as a passive device for measuring the relative intensity of one or more radiation sources distributed about a point in any given environment. Stationary disposition of the probe assembly within a measurement environment for a specified period of time, permits the selective accumulation of useful data in the various detector means 16 which can then be processed and the relative dose in each detector plotted in a polar coordinate system to illustrate the relative intensity of incident ionizing radiation versus direction.

Having thus described my invention, I claim:

1. A radiation responsive probe assembly for passive fixed positioning at a point within an area in which one or more remote radiation sources are to be surveyed, comprising a body member of generally spherical configuration formed of high density material having low radiation transmissivity, means for fixedly positioning said body member in stationary relation within such area in which remote radiation is to be surveyed so as to be omnidirectionally exposed to all possible sources of radiation emanating from within said area, a plurality of radially oriented collimating recesses disposed in predetermined spatial relation in the outer surfaces of said body portion to facilitate omnidirectional radiation intensity measurement, and a passive radiation detection means disposed in the base of each of said plurality of recesses individually responsive to radiation incident thereon.

2. A directional radiation probe assembly as set forth in claim 1 wherein said radiation detection means are of passive character and integrate radiation incident thereon.

3. A directional radiation probe assembly as set forth in claim 2 wherein said passive radiation detector means detector comprises thermo luminescent dosimeters.

4. A directional radiation probe assembly as set forth in claim 2 wherein said passive radiation detector means comprises exposable film means.

* * * * *